Oct. 25, 1966  J. O. WOOD  3,280,878
CYCLIC COMPRESSIVE STRESS MEMBER
Filed Jan. 19, 1965  7 Sheets-Sheet 1

Inventor:
John Oswald Wood
by Benj. T. Rauber
attorney

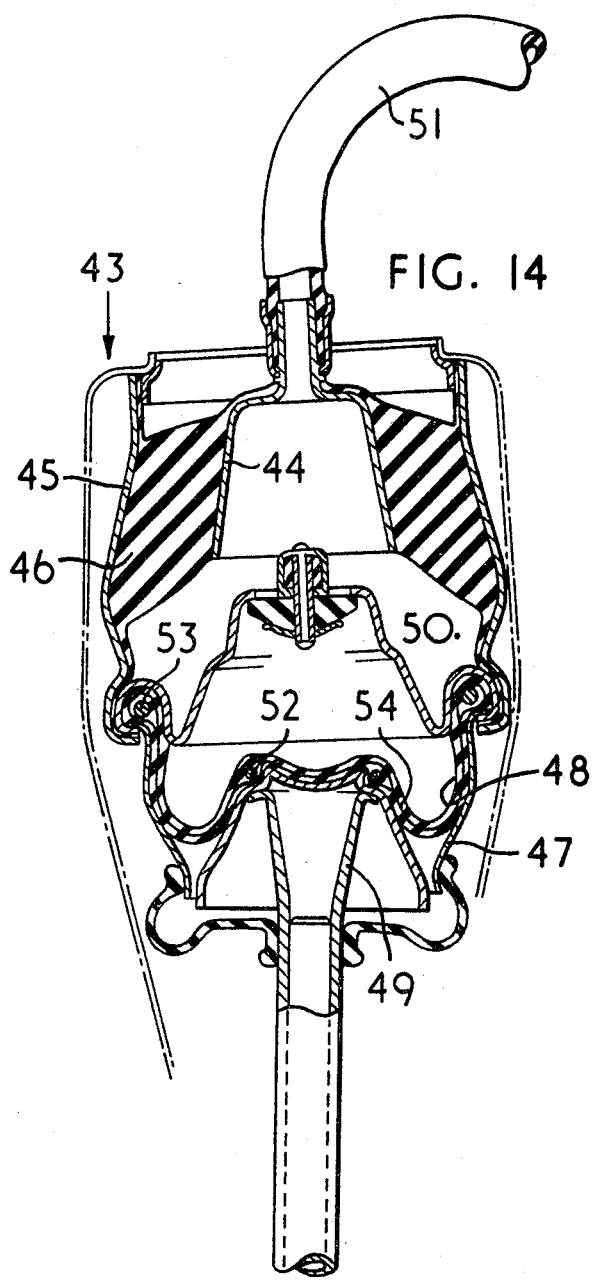

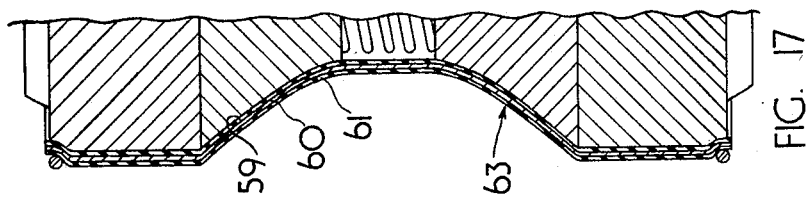
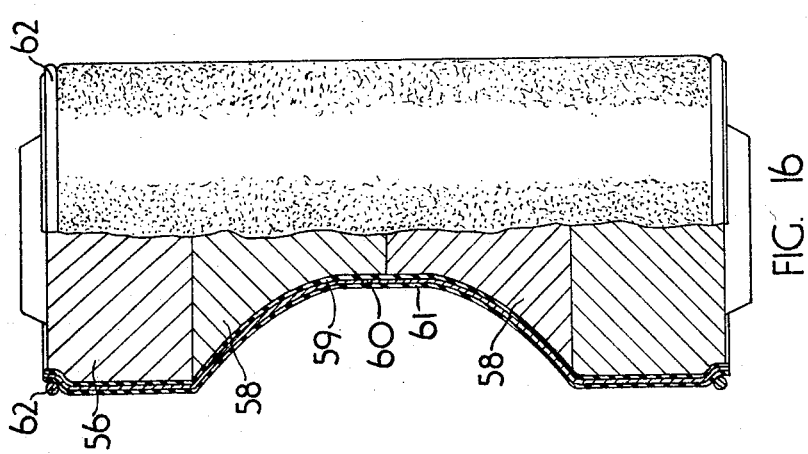
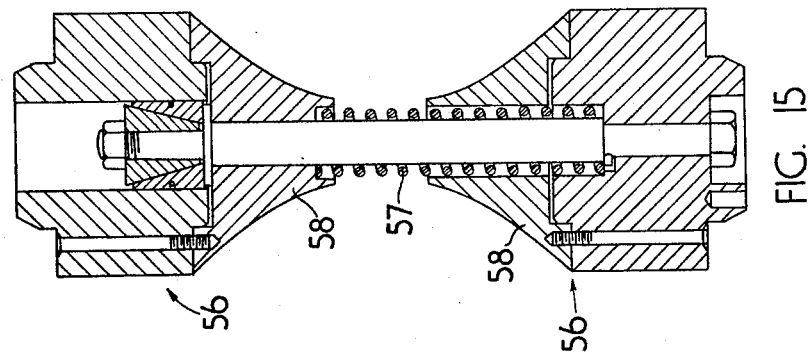

United States Patent Office 3,280,878
Patented Oct. 25, 1966

3,280,878
CYCLIC COMPRESSIVE STRESS MEMBER
John Oswald Wood, Two Gates, Tamworth, England, assignor to Dunlop Rubber Company, Limited, London, England, a British company
Filed Jan. 19, 1965, Ser. No. 426,596
Claims priority, application Great Britain, Feb. 1, 1964, 4,363/64
3 Claims. (Cl. 152—361)

My invention relates to articles of reinforced composition such as a vulcanized rubber composition, a part or parts of which are subject to cyclic compressive stresses, that is, stresses which tend to compress the part or parts cyclically when in use.

Examples of such articles are pneumatic tires, rubber belting and flexible diaphragms of reinforced rubber which are used in the pneumatic suspensions of vehicles.

A pneumatic tire, for example, comprises a carcass of vulcanized rubber composition of an approximately torous form open at its inner periphery and extending from one of a pair of axially spaced bead wires at the inner periphery radially outwardly forming a side wall, thence axially through a tread portion to a second side wall and to the other bead wire. The reinforcement extends from one bead wire to which it is secured closely adjacent to the inner surface of the tire carcass. Heretofore, the reinforcement has consisted of parallel closely spaced cords of nylon, cotton, rayon, Dacron or other filamentary material extending closely adjacent to the inner surface of the carcass from one bead wire through the side walls and tread portions to the other bead wire. A braker strip or strips are positioned in the carcass in the tread portion closely adjacent to the reinforcement cords. The cords of the reinforcement and breaker assembly are so arranged that the tread portion is held substantially flat viewed in an axially extending plane and, therefore, are substantially inextensible and incompressible in the direction of the cords.

When a tire is loaded with its portion of the vehicle and its load, it is flattened on a chordwise plane until the area of the plane times the air pressure in the tire equals the load. As the tire rotates successive portions of the tire tread pass from the circular shape into and out of the chord shape. During this passage into and out of the chord, the tire tread passes through an arc of small radius on an axis parallel with the axis of the tire. The length of the arc increases with its distance from the axis of the arc and as the reinforced radially inward portion of the carcass is incompressible along the arc the tread radially outward of this incompressible part must stretch to the increase in the length due to the arc through which the tread passes. The stretching passes cyclically through the periphery as the wheel rotates and when the vehicle travels at a high speed there are several cycles per second. This cyclic stretching absorbs energy which is transformed into heat and increases the temperature of the tire. It has a deteriorating effect on the tire.

In tires, according to my invention, subject to cyclic distortions of the above type, the distortions in the tread portion and tread of the tire are greatly reduced by providing a reinforcement that is inextensible circumferentially but is compressible circumferentially so that inwardly of a neutral zone in the tread portion the carcass is compressed circumferentially and outside this zone is stretched circumferentially as it passes into contact with the ground or supporting surface. The compression and stretching is about an axis intermediate the inner and outer surfaces and the arcs through which the tread is compressed and stretched respectively are greatly reduced with a greatly diminished consumption of energy and heating of the tire.

This is accomplished in the tire of my construction by means of a reinforcement of a lace of cords in which the cords of the lace extend through the carcass from one bead to the other in a zig-zag formation with the bends or bights of one cord interlacing and interlocking with the bights of the other to form the lace structure. The individual cords have a uniform pitch which is the distance, on a line parallel with the direction of the lacings, between a pair of successive inclined lengths of the cord or two successive bights on such line. The lacings have an amplitude which is equal to the distance between a pair of parallel lines through the bights of the cord. The lace may be stretched lengthwise of the direction of the cords in the lace, the pitch being increased and the amplitude decreased. Or it may be stretched transversely of this direction with an increase in amplitude and decrease in pitch.

In constructing a tire a length of tubular lace is mounted on a lining layer of vulcanizable rubber composition on a cylindrical former and the tire carcass of rubber with breaker strips is built up in known manner and a tread formed thereon. Then the carcass is expanded in a mold to an open torous. The portion of the lace in the tread of the carcass is stretched circumferentially, the amplitude increasing and the pitch decreasing. The lacing in the tread portion is thus stretched to the point where it is no longer extensible under the force of the inflation pressure but it is contractible. Consequently, when the tread portion of the tire passes cyclically to the flattened condition the carcass may be contracted and there is less stretching of the tread with a resulting decrease of the deleterious effects of fatigue and temperature rise.

This or similar results may be obtained by my invention in belting, diaphragms and other articles.

Embodiments of the invention will now be described, by way of example, with reference to the accompanying drawings in which.

Figure 5:
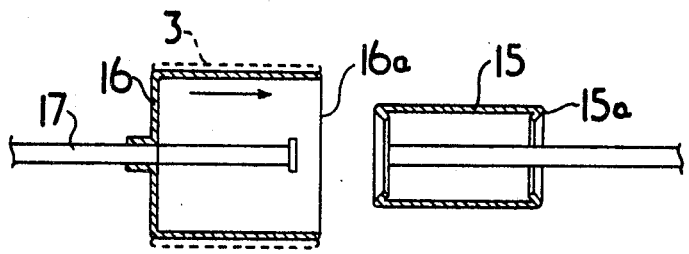
Figure 6:
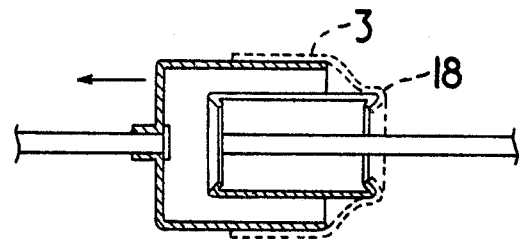
Figure 7:
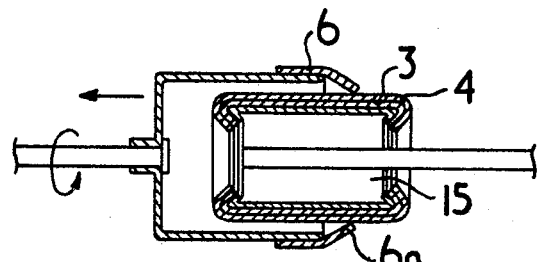
Figure 8:
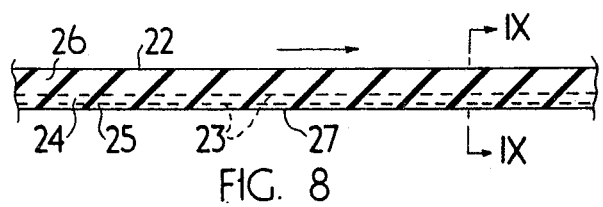
Figure 9:
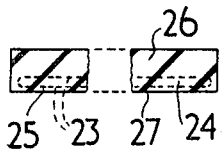
Figure 10:
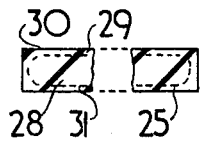
Figure 11:
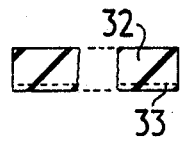
Figure 12:
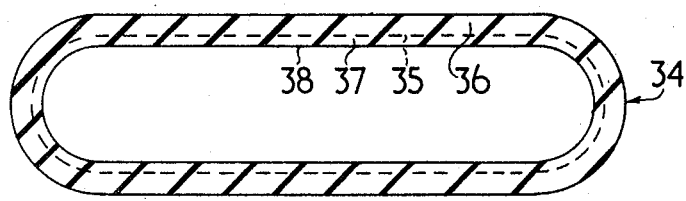
Figure 13:
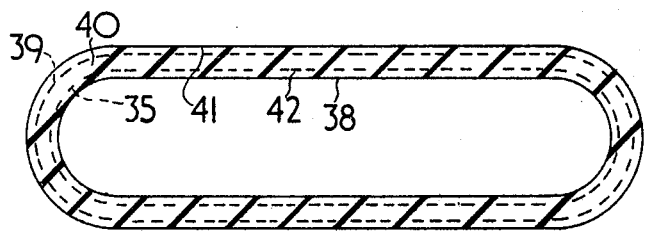
Figure 18:
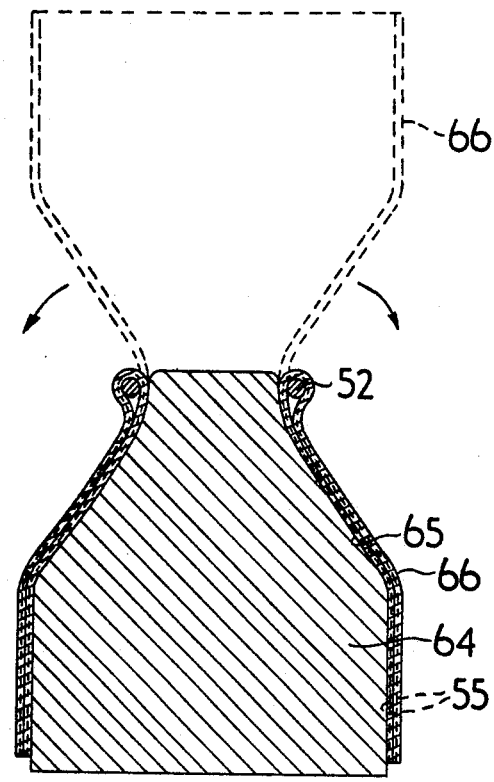

FGURE 4 is an elevational view of apparatus for applying latex resorcinol formaldehyde dispersion to a tubular length of lace for use upon the pneumatic tire;

FIGURES 5 to 7 are diagrammatic side elevational views of tire building apparatus showing stages in the manufacture of the pneumatic tire;

FIGURE 8 is a longitudinal cross-sectional view of part of a belt segment forming a second embodiment of the invention;

FIGURE 9 is a cross-sectional view along line IX—IX in FIGURE 8 of the belt of FIGURE 8;

FIGURE 10 is a view similar to FIGURE 9 of a modification of the second embodiment;

FIGURE 11 is a lateral cross-sectional view of a belt forming a third embodiment;

FIGURE 12 is a longitudinal cross-sectional view of a belt forming a fourth embodiment;

FIGURE 13 is a view similar to that of FIGURE 12 of a modification of the fourth embodiment;

FIGURE 14 is a longitudinal cross-sectional view of a hydraulic vehicle suspension system incorporating a diaphragm forming a fifth embodiment of the invention;

FIGURES 15 to 19 are cross-sectional views of apparatus for making the diagram shown in FIGURE 14 showing different stages in the manufacture of the diaphragm.

Figure 1:
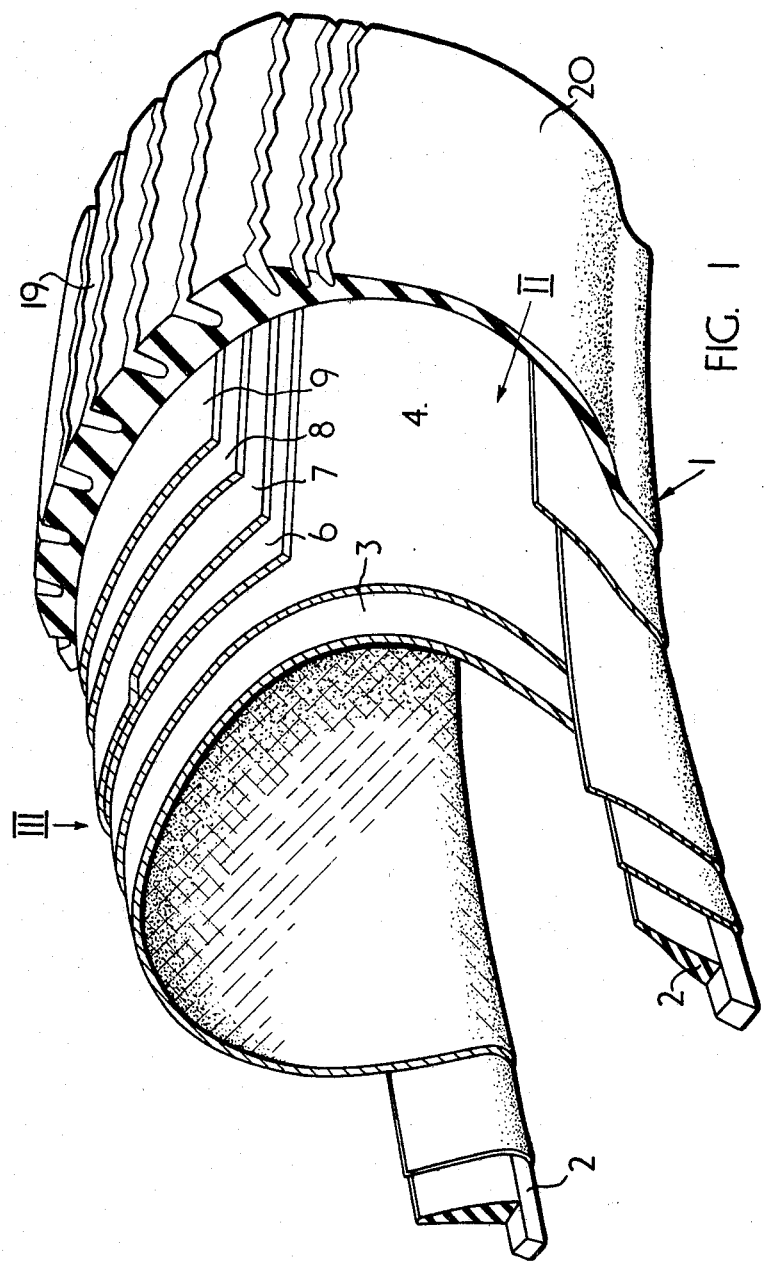
FIGURE 1 is an isometric view of part of a pneumatic tire forming one embodiment of the invention, the tire being sectioned in stepped manner.
Figure 2:
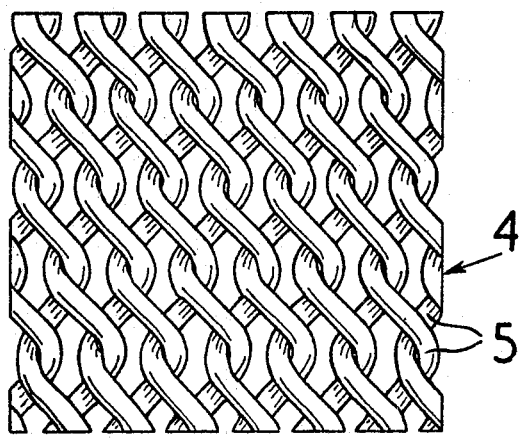
FIGURES 2 and 3 are views of parts of the tire shown in FIGURE 1, respectively, in the direction of arrows II and III in FIGURE 1.
Figure 3:
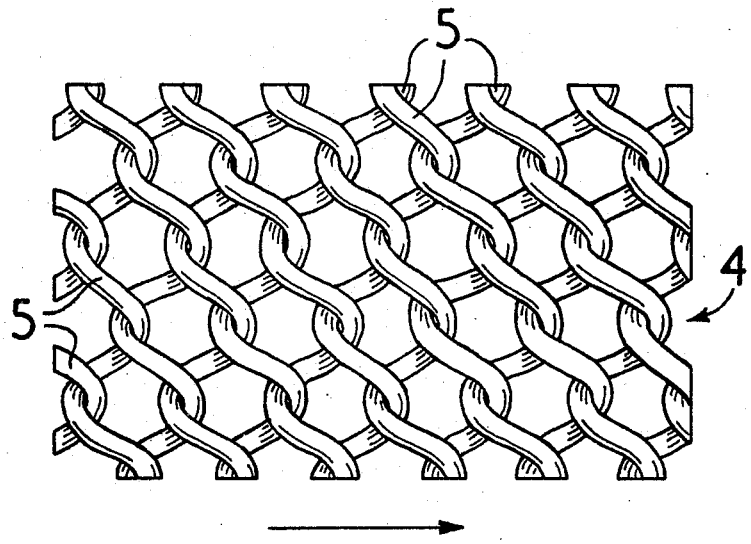

In a first embodiment shown in FIGURES 1 to 3, a pneumatic tire 1 incorporates two bead wire and filler assemblies 2 and two carcass reinforcement layers 3 and 4 which extend between the assemblies, the ends of the layers being turned around the assemblies 2 as shown in FIGURE 1. Each of the layers 3 and 4 comprises a rubberised nylon yarn lace structure which, as shown in FIGURES 2 and 3, is formed from a plurality of lengths 5 of nylon yarn embedded in rubber, the lengths 5 extending in sinuous manner in a general direction at 90° to a circumferentially extending line, with each length of yarn being intertwined with the next adjacent length on each of its sides.

The carcass reinforcement layers are surmounted by four breaker reinforcement layers 6, 7, 8 and 9 each of which comprises a rubberised nylon yarn lace structure of similar construction to that of each of the layers 3 and 4. Each of the layers 6 to 9, however, is disposed with the lengths of yarn extending in a general direction substantially at a bias angle of 21° to the midcircumferential plane of the tire, the angle of the lengths of material in each layer being of opposite sense, with respect to said plane, to the angle of the lengths in the or each adjacent layer.

Figure 4:
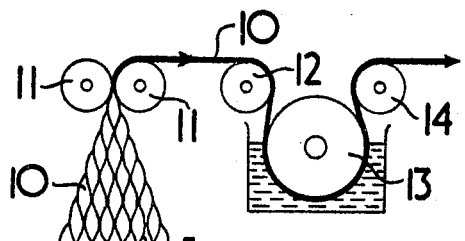

To make the tire described above, a continuous tubular length 10 of lace (FIGURE 4) for making the carcass reinforcement, is made from the nylon yarn upon a lace making machine as described in the complete specification of my copending patent application Ser. No. 426,262, of Jan. 18, 1965, each length 5 of yarn extending longitudinally of the tube. The tubular length 10 of lace is drawn upwardly from the lace making machine by means of a pair of nip rolls 11, the length 10, during passage through the nip between the rolls being flattened from an open to a diametrically flattened tubular shape, as shown in FIGURE 4. The flattened tubular length then passes from the rolls 11 and around rolls 12, 13 and 14 which are all driven at peripheral speeds substantially equal to the peripheral speeds of the rolls 11 so that there are substantially no tensile forces imposed upon the lace and thus there is substantially no deformation of the lace in its longitudinal direction. As the tubular length 10 passes around the roll 13, it is dipped into a latex resorcinol formaldehyde dispersion which covers each of the lengths 5 of yarn in the lace, while allowing the interstices in the lace to remain. After passing around the roll 14, the latex coated length of lace is passed in its flattened tubular form through a drying chamber (not shown) to dry the latex dispersion and adhere adjacent lengths 5 together at the points at which they are intertwined with one another to hold the lace structure in substantially the shape in which it was made.

The length 10 of lace is then cut into short flattened tubular lengths to form the carcass and breaker reinforcement layers 3 to 9 shown in FIGURE 1.

The reinforcement layers of lace are applied to a tire building former 15 (FIGURES 5 and 6) by means of a cylinder 16 which is axially slidably mounted upon a shaft 17, mounted coaxially with the former 15, the cylinder 16 being axially movable between one position in which it surrounds and another position in which it is axially removed from the former. The shaft 17 is drivably connected to an electric motor (not shown) for rotating the cylinder 16, and a pneumatically-operated piston and cylinder assembly (not shown) is operably connected to the cylinder 16 for moving it axially. Adjustable air restriction valves are provided in feed pipes through which air under pressure is fed to the piston and cylinder assembly so that the speed of axial movement of the cylinder 16 may be adjusted for a purpose to be described.

After an unvulcanised inner liner (not shown) and a first layer of unvulcanised rubber (also not shown) have been wrapped around the former 15, the reinforcement layer 3 is manually opened out from its flattened tubular form to the open tubular form or "pocket" as referred to in the tire building art. This operation is practicable because it has been found that while the latex adheres the intertwining parts of the lengths of nylon yarn, it adheres the diametrically opposite sides of the flattened tubular form of the length of lace to a lesser degree, so that the length of lace may be opened manually without disturbing the adherence between the intertwined parts of the nylon yarn lengths. The layer 3 is then positioned around the cylinder 16 in a position of the cylinder removed from the former 15 as shown in FIGURE 5, the layer being located in a predetermined position upon the cylinder.

The cylinder 16 is then moved axially by the piston and cylinder assembly into a predetermined axial position surrounding the former in which the midcircumferential plane of the cylinder is offset from the midcircumferential plane of the former with its end 16a radially in alignment with the end 15a of the former. The layer 3 is then manually moved axially across the surface of the cylinder 16 and over its end 16a until the layer 3 is located upon the cylinder in a position such that when transferred from the cylinder to the former it lies symmetrically with respect to the midcircumferential plane of the former.

An end 18 of the layer 3 which now extends over the end 16a of the cylinder is urged radially inwardly around the end of the former as shown in FIGURE 6 and adheres to the first layer of unvulcanized rubber upon the former. The cylinder 16 is retracted axially, as shown in FIGURE 6, in the direction of the arrow in FIGURE 6 while the layer 3 is held axially in position upon the former by the adherence of its end 18 to the rubber layer. During retraction of the cylinder 16 to remove it from around the former and from within the layer 3, the layer 3 is moved radially inwardly progressively from its end 18 to its other end so that the layer 3 and the unvulcanized rubber layer are made to adhere. In the position of the layer 3 upon the rubber layer, the ratio of the amplitude to the pitch of each length of yarn is substantially .23/1.

The reinforcement layer 4 is then applied to the former in a similar manner to that described for the layer 3 after a second layer of unvulcanized rubber has been superposed upon the layer 3.

A third layer of unvulcanized rubber is then superposed upon the layer 4 and the breaker layer 6 is applied to the carcass. The breaker layer 6 is applied in a manner similar to that described for the layer 3 except that in this case in which the layer 6 is axially narrower than the layer 3, the cylinder 16 is located in a position surrounding the former with its midcircumferential plane offset to a greater degree than for applying the layer 3 (as shown in FIGURE 7) to allow for symmetrical location of the layer 6 upon the former. An overhanging end 6a of the layer 6 is then applied to the partially built carcass upon the former. During retraction of the cylinder 16 which then follows, the cylinder is rotated upon the shaft 17 in one direction by the electric motor and the speed of retraction of the cylinder 16 is controlled by adjustment of the restriction valves. This rotational movement during retraction of the cylinder imparts a twist to the portion of the layer 6 remaining upon the cylinder relative to the portion of the layer lying upon the carcass so that the lengths of nylon yarn are orientated from a position in which they extend in a general direction at 90° to the midcircumferential plane to a position in which they extend at a bias angle to said plane such that after shaping of the tire, the nylon lengths of the breaker layer extend substantially at an angle of 21° to said plane.

The breaker layers 7, 8 and 9 and further unvulcanized rubber layers are then positioned upon the partially built carcass, the breaker layers being located upon the carcass in a manner similar to that described for the layer 6. However, when the layers 7 and 9 are being applied, the cylinder 16 is rotated in the opposite direction from that in which it is rotated during the application of the layer 6, so that the lengths of yarn in each of the layers 7 and 9 extend at a bias angle of opposite sense, in relation to the midcircumferential plane, to the lengths of yarn in the layers 6 and 8. The bead wire and filler assemblies 2 are then located, one at each end of the former, the ends of the carcass reinforcement layers are turned around the bead wires, and tread and sidewall rubbers 19 and 20 are applied to the carcass.

The substantially cylindrical raw tire, thus completed, is then shaped into a toroidal condition into a vulcanizing mold and is vulcanized. During shaping and molding, the reinforcement layers become embedded within the unvulcanized rubber layers. Also during shaping, the reinforcing layers are circumferentially tensioned progressively from the beads to the crown region and the amplitudes of the sinuations of each length of yarn increase progressively, from each bead region to the crown of the tire, due to the gradual increase in circumferential length of the shaped reinforcement layers from the bead region to the crown. This is accompanied by a progressive reduction in pitch of the sinuations from each bead region to the crown of the tire.

After shaping, each length of lace in the carcass reinforcement layers 3 and 4 has an amplitude to pitch ratio which varies from substantially .23/1 in the bead region, to substantially .35/1 in the mid-sidewall region and substantially .5/1 in the crown region. FIGURE 2 shows diagrammatically the amplitude to pitch relationship in the mid-sidewall region of the tire and FIGURE 3 shows that relationship in the crown region. Similarly, the amplitudes of each length of yarn in the breaker layers increase while its pitches decrease and the orientation of the lengths of yarn in the breaker layers changes during shaping so that the lengths extend in a general direction substantially at an angle of 21° to the midcircumferential plane.

In use, the loading on the tire, the part of the tire in contact with the ground, is flattened and as the tire rolls, successive parts about the circumference of the tire are subjected to the load so that each part of the tire is thus loaded and flattened cyclically. This cyclic flattening causes a cyclic bending placing the outer part of the tire carcass in tension and the inner part in compression, or imposing a tension stress on the outer part and a compressive stress on the inner part of the bend. Between these opposite stresses is a neutral unstressed zone. The reinforcement being on the inner part of the tire is subject to the compression along with the part of the carcass in which it is embedded. Similar stresses occur in belting passing around a pulley and in a rolling lobe diaphragm and other articles subject to flexing. The stress thus imposed on the reinforcement is taken up by a decrease in the pitch and increase in the amplitude of the turns or coils of the reinforcement.

The fatigue resistance of the reinforcement layers is assisted by the ability of the reinforcement layers to contract and lengthen during cyclic compressive stresses.

As mentioned above, in the crown regions, the pitches of the sinuations of the nylon yarns are less than, and their amplitudes are greater than, those of the lengths of yarn in the sidewalls so that the degree of axial contraction in the crown region which may be taken up by decrease in the pitch of the sinuations, is less than that in the sidewall regions under cyclic compressive stresses. However, under the relatively small compressive stresses imposed in an axial direction on the crown region, the axial contraction of the reinforcement layers in this region does not exceed that which is taken up by decreasing the pitch of the sinuations. In addition, because of the circumferentially stretched condition of the carcass and breaker reinforcement layers in the crown region, resistance is offered to circumferential extension of this region of the tire.

Further, the tire described above has the advantage over conventional tire constructions that the reinforcement layers of lace do not require to have overlapping ends as they are in endless form.

In addition, it is apparent that a tire as described above and incorporating breaker layers may be built completely in its substantially cylindrical condition and does not require the breaker layers to be applied to the tire carcass after the shaping operation.

In a modification of the first embodiment (not shown) each reinforcement layer 3 and 4 is formed from a short tubular length of lace, the lengths of nylon yarn in the cylindrical condition of the tubular length, having sinuations the pitches of which progressively increase from each end of the tubular length to a position midway between the ends so that after shaping of the tire, the pitches of each length of yarn are substantially constant dimensions from one bead region to the other, while the ratio of amplitude to pitch in the mid-sidewall region is substantially .35/1.

In a second modification of the first embodiment, the breaker reinforcement layers are of similar construction to those described in the first embodiment except that the lengths of nylon yarn in the breaker reinforcement layers extend at an angle of 90° to the midcircumferential plane.

In a third modification of the first embodiment, the breaker reinforcement layers are replaced by two breaker reinforcement layers each of which comprises a plurality of parallel substantially inextensible cords which extend substantially at an angle of 21° to the midcircumferential plane, the cords in one layer extending in a direction of opposite sense, with respect to said plane to the cords in the other layer.

In a second embodiment of the invention (FIGURES 8 and 9), an endless conveyor belt comprises a plurality of segments 22 (part only of one of which is shown in FIGURE 8) located in end-to-end relationship with one another longitudinally of the belt. Each segment 22 comprises two substantially inextensible reinforcement layers 23 embedded in rubber, the two layers being formed from a flattened tube (FIGURE 9) of nylon yarn lace structure of similar construction to that described in the first embodiment, the layers being jointed at the sides of the belt and the nylon yarn extending in a general direction at substantially 0° to the longitudinal direction of the belt indicated by the arrow in FIGURE 8. The reinforcement layers are secured at the ends of the segment to conventional transversely extending rigid end fittings (not shown) of the segment.

To manufacture the belt segment, a continuous tubular length of lace is manufactured with lengths of nylon yarn in the manner described in the first embodiment, the formed tube in flattened form being stretched axially until it is substantially inextensible in the axial direction and then coated with a latex resorcinol-formaldehyde dispersion as described in the first embodiment. The tube may be conveniently stretched by driving the roll 12 (FIGURE 4) at a peripheral speed which is greater than that of the nip rolls 11. The rolls 13 and 14 are driven at a peripheral speed substantially equal to that of the rolls 12 to maintain the stretched condition.

The continuous length of lace, in flattened tubular form is then cut into short tubular lengths, one for each belt segment. Each segment is then made by opening a short tubular length of lace, locating a layer 24 of unvulcanized rubber within the opened tubular length and then diametrically flattening the tubular length to form the two reinforcement layers, one superposed upon the other. The layers, so formed, are sandwiched between a layer 25 and a thicker layer 26 each of unvulcanised rubber and the ends of the layers, i.e. the ends of the original short tubular length of lace, are secured to the end fittings so that the lengths of nylon yarn extend generally in a longitudinal direction of the segment. The segment is then molded and vulcanized during which the lengths of yarn in the layers 23 become embedded within the layers of rubber. The layer 25 of rubber being thin relative to the layer 26 ensures that, in the finished condition of the segment after vulcanisation, the reinforcement layers lie adjacent to a surface 27 of the belt.

When the segments 22 are assembled to form the conveyor belt, the reinforcing layers 23 lie adjacent to the inner peripheral surface of the belt (formed by the surfaces 27 of each segment), between this surface and the neutral axis of the belt.

In use, the conveyor belt is driven around a plurality of pulley wheels (not shown) which engage its inner peripheral surface. As the belt is driven around the pulley wheels, therefore the material adjacent the inner surface 27 and, the reinforcement layers are subjected to longitudinal cyclic compressive stresses which move progressively around the belt from one portion of the belt to another. When subjected to these loadings the material adjacent the inner surface 27 and, each portion of the reinforcement layers contract longitudinally accompanied by a decrease in the pitch and an increase in the amplitude of the sinuations of the yarn. Between compressive loadings, each portion of the reinforcement layers returns to its longitudinally stretched condition.

In a first modification of the second embodiment shown in FIGURE 10, the layer 24 of rubber is replaced by a layer 28 of rubber which is relatively thick compared with the layer 25, and a layer 29 of rubber of approximately equal thickness to the layer 25 replaces the layer 26 so that the reinforcement layers 23 lie one adjacent to each surface of the belt segment and one on each side of the neutral axis of the segment.

A conveyor belt made with these segments is of particular use in a case wherein it is necessary to drive the belt around pulley wheels which are disposed some in engagement with one peripheral surface 30 of the belt and at least one in engagement with its other peripheral surface 31, so that each reinforcement layer is subjected to cyclic compressive stresses, one on each side of the belt.

In another modification of the second embodiment (not shown) an endless conveyor belt is formed from a single segment of the construction of the second embodiment the single segment being joined end-to-end.

In a third embodiment (FIGURE 11) a conveyor belt comprises a plurality of segments 32 each of which is similar in construction to the segments 22 of the second embodiment, but in this case instead of two reinforcement layers, each segment comprises a single reinforcement layer 33 adjacent the surface of the segment lying on the inner peripheral surface of the belt. The single reinforcement layer is formed from a flat sheet of nylon yarn of lace construction in which each length of nylon yarn is intertwined with an next adjacent length on each of its sides and extends in a general direction at 0° to the longitudinal direction. The reinforcement layer lies in a stretched condition within the segment so as to be substantially inextensible in the longitudinal direction.

In a fourth embodiment, shown in FIGURE 12, an endless conveyor belt 34 is a single endless member comprising one endless reinforcement layer 35 of lace structure sandwiched between two rubber layers 36 and 37 the layer 35 being disposed adjacent the inner peripheral surface 38 of the belt. The reinforcement layer 35 is substantially inextensible longitudinally of the belt and the lengths of nylon yarn extend in a general direction normal to the length of the belt.

To manufacture the belt, a continuous length of lace is manufactured with lengths of nylon yarn as described in the first embodiment. A short tubular length of lace is then severed from the continuous length to form the reinforcement layer. The short tubular length is then stretched circumferentially to make it substantially inextensible in the circumferential direction and is then dipped in latex resorcinol formaldehyde dispersion which, after drying, adheres the adjacent lengths of yarn together at the points at which they are intertwined with one another to hold the tubular length in its stretched condition. The layers 36 and 37 of rubber in an unvulcanised state thereof are then applied, one to each surface of the short severed length of lace, and this assembly is vulcanized to form the belt, the severed length of lace extending circumferentially in the longitudinal direction of the belt and being substantially inextensible in this direction.

In use, the belt behaves in a manner similar to that described for the belt of the second embodiment except that, in this instance, longitudinal compressive stressess cause an increase in the pitch and a decrease in amplitude of the sinuations of the nylon lengths.

In a modification of the fourth embodiment (FIGURE 13) an additional reinforcing layer 39 is disposed within the belt, adjacent to the outer peripheral surface thereof. To manufacture this modified construction, two continuous tubular lengths of material are formed, one being either slightly larger in diameter than the other or being formed of nylon yarn the sinuations of which have a shorter pitch than in the other, so that, in the circumferentially stretched condition, one tubular length is of larger diameter than the other.

After a short tubular length is severed from each continuous length, each short length is circumferentially stretched and dipped into latex resorcinol formaldehyde dispersion which after drying holds it in its stretched condition. These short lengths are then disposed radially one within the other to form the reinforcement layers 35 and 39 and are radially separated by a tubular length 40 of unvulcanized rubber. Two lengths 41 and 42 of unvulcanized rubber, which are thinner than the tubular rubber length 40 are then applied one to each surface of the assembled layers to form the raw belt which is then molded and vulcanized.

The belt may be used for driving around pulley wheels disposed on each of its sides as described for the first modified construction of the second embodiment, compressive stresses causing an increae in pitch and a decrease in amplitude of the sinuations of the nylon lengths.

In a fifth embodiment, a hydraulic suspension system for a vehicle, known as the "Hydrolastic" suspension system, comprises a spring element 43 for each wheel of the vehicle as shown in FIGURE 14. Each spring element comprises an inner rigid sleeve 44 and an outer rigid sleeve 45 between which is bonded a natural rubber spring 46. Immediately beneath the spring is a hydraulic displacer unit comprising a cylinder unit 47, an axially movable diaphragm 48, and a piston assembly 49. A chamber within the spring element bounded by the rubber spring 46, the outer sleeve 45 and the diaphragm 48, is connected by a pipe 51 with a similar chamber within another spring element on the same side of the vehicle.

The diaphragm of each spring element is of annular form, having a radially inner bead wire 52 and outer bead wire 53 and a rubber covered reinforcement 54 extending between, and secured to the bead wires. The reinforcement comprises two layers 55 (FIGURE 19) formed from a nylon yarn lace structure of similar construction to that described in the preceding embodiments.

Each diaphragm is manufactured upon a forming spool (FIGURE 15) which is similar in construction to the forming spool described in the complete specification of our British Patent No. 969,891 the spool comprising a pair of cylindrical coaxial end portions 56 which are normally axially-spaced apart by a coil spring 57 and are movable towards and away from one another, each end portion having a frusto-conically shaped member 58 extending coaxially towards the midcircumferential plane of the spool.

Figure 19:
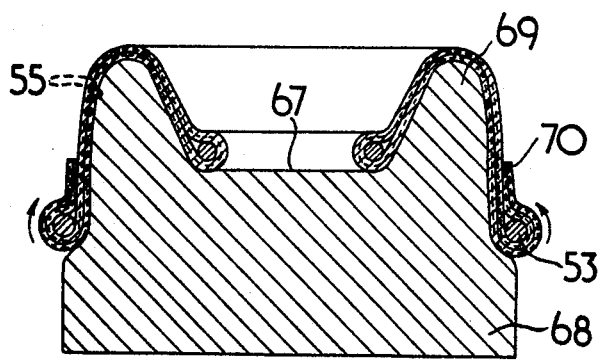

To manufacture each diaphragm, the two end portions 56 are moved towards one another until the members 58 lie in engagement as shown in FIGURE 16. The portions 56 are then locked in position. A layer 59 of unvulcanized rubber is then wrapped in substantially cylindrical form around the end portions so as to engage solely the outer surfaces of the end portions. A latex-coated tubular length 60 of lace to form the layers 55 is placed coaxially around the layer 59. The lengths of yarn in the lace extend in a general direction at 90° to the mid-circumferential plane of the forming spool and the ratio of the amplitudes to pitches of the yarn lengths is substantially .5/1. After a second unvulcanized rubber layer 61 is placed around the length 60 of lace, the remote ends of the assembly so formed are gripped by resilient rubber rings 62 placed therearound. The end portions are then moved axially apart to the position of FIGURE 17 so that the unsupported parts of the layers 59, 60 and 61 surrounding the frusto-conical member are stretched axially, stretching of the length 60 of lace being accompanied by an increase in pitch of the sinuations. This results in a decrease in the amplitude of these sinuations so that the unsupported part of the length 60 is drawn radially inwardly to be shaped upon the frusto-conical member together with the lengths 59 and 61 of rubber (FIGURE 17), to form a shaped sock 63. The sock is then removed from the spool by detaching one end portion and then removing the sock from the other end portion, and, as described in the specification of Patent No. 969,891, one half 65 of the sock is fitted over a first building former 64 (FIGURE 18), the radially inner bead 52 then being placed around the neck of the sock supported upon the frusto-conical member. The unsupported half 66 of the sock is then folded axially over the bead wire (from its dotted outline position in FIGURE 18) until it completely surrounds the other end and the two ends of the length of lace lie in superposed relationship to form the two reinforcement layers 55 (see full outline position on FIGURE 18). The two halves of the sock are then removed from the former 64, are inverted and the beaded end is fitted into a cavity 67 of a second building former 68 (FIGURE 19). The free ends 70 of the sock are then drawn downwards as described in the aforementioned specification, and over an anular ridge 69 of the former 68, and the bead wire 53 is positioned to encircle the sock adjacent the free ends. The free ends 70 of the sock are then folded back over the bead wire 53 as shown in FIGURE 19.

The sock so formed now forms the diaphragm in an uncured condition which is then completely removed from the former 68 and is vulcanized.

In use, each reinforcement layer of the diaphragm is subjected to changes in compression load imposed as described above by flexure about the bight of the diaphragm shown in FIGS. 14 and 19, in operation.

In modifications (not shown) of all of the embodiments described, each reinforcement layer is replaced by a composite reinforcement layer of lace comprising two reinforcement layers which lie face-to-face and are joined together by some, at least, of the lengths of nylon yarn extending from one layer to the other.

In further modifications, the lace structure described in which each length of nylon yarn is intertwined with the next adjacent length on each of its sides, is replaced by a more complicated construction in which each length is intertwined with two or more adjacent lengths on each side.

Having now described my invention what I claim is:

1. A pneumatic tire comprising a pair of axially spaced bead portions, a tread portion between said bead portions and a pair of side wall portions, one between one of said bead portions and said tread portion, and all of elastomeric composition and a reinforcement extending from one bead portion adjacent to the inner surface of and within said tire through the side walls and tread portions to the other bead portion, said reinforcement comprising a lace of cords extending in zig-zags with the zig-zags of one cord interlocked with the apices of the next adjoining to form the lace, the pitch and amplitude of the zig-zags being such as to make the reinforcement substantially inextensible in a circumferential direction in one direction and contractible in the opposite direction under compressive stresses in flattening portions of said tread portion under load.

2. The article of claim 1 in which the ratio of amplitude to pitch of said cords in said tread portion is substantially 0.5 to 1 and substantially 0.35 to 1 in the mid side wall portion.

3. The article of claim 1 having breaker strips of interlocked zig-zag cord, the cords of the breaker strips having a general direction of substantially 21° to the mid circumferential plane of the tire, alternate breaker strips having reverse directions of inclination to said mid circumferential plane.

References Cited by the Examiner

UNITED STATES PATENTS

| 722,459 | 3/1903 | Schaefer | 152—361 X |
| 1,201,257 | 10/1916 | Cobb | 152—361 X |
| 1,228,650 | 6/1917 | Christian | 152—361 X |
| 2,820,500 | 1/1958 | Dickerson | 152—362 |

FOREIGN PATENTS

| 1,146,809 | 5/1957 | France. |
| 266,015 | 2/1927 | Great Britain. |
| 477,492 | 12/1937 | Great Britain. |

OTHER REFERENCES

Grove, Webster's Third New International Dictionary, G. & C. Merriam Co., Springfield, Mass, 1963, page 1260, relied on.

ARTHUR L. LA POINT, *Primary Examiner.*

ALEXANDER WYMAN, *Examiner.*

G. D. MORRIS, C. W. HAEFELE, *Assistant Examiners.*